United States Patent
Mestha et al.

(10) Patent No.: US 6,236,474 B1
(45) Date of Patent: May 22, 2001

(54) DEVICE INDEPENDENT COLOR CONTROLLER AND METHOD

(75) Inventors: Lingappa K. Mestha, Fairport; Sohail A. Dianat, Pittsford; Mark Alan Scheuer, Williamson, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/083,202

(22) Filed: May 22, 1998

(51) Int. Cl.⁷ ............................. G03F 3/08; B41B 15/00
(52) U.S. Cl. ........................................ 358/520; 358/1.9
(58) Field of Search .................................. 358/504, 518, 358/520, 523, 1.9; 382/167, 274

(56) References Cited

U.S. PATENT DOCUMENTS

| | | | |
|---|---|---|---|
| 3,870,968 | 3/1975 | Vosteen et al. | 330/298 |
| 4,205,257 | 5/1980 | Oguro et al. | 315/39.69 |
| 4,403,866 | 9/1983 | Falcoff et al. | 366/132 |
| 4,724,461 | 2/1988 | Rushing | 399/48 |
| 4,853,639 | 8/1989 | Vosteen et al. | 324/457 |
| 4,887,217 | 12/1989 | Sherman et al. | 700/117 |
| 5,003,327 | 3/1991 | Theodoulou et al. | 347/112 |
| 5,045,882 | 9/1991 | Roehrs et al. | 399/72 |
| 5,243,383 | 9/1993 | Parisi | 399/50 |
| 5,345,315 | * 9/1994 | Shalit | 358/406 |
| 5,481,380 | * 1/1996 | Bestmann | 358/404 |
| 5,544,258 | * 8/1996 | Levien | 382/169 |
| 5,559,173 | 9/1996 | Campo et al. | 523/303 |
| 5,642,202 | * 6/1997 | Williams et al. | 358/406 |
| 5,662,044 | 9/1997 | Loffler et al. | 101/492 |
| 5,664,072 | * 9/1997 | Ueda et al. | 395/109 |
| 5,673,075 | * 9/1997 | Jacobs et al. | 347/131 |
| 5,694,224 | * 12/1997 | Tai | 358/455 |
| 5,696,889 | * 12/1997 | Morikawa | 395/109 |
| 5,708,916 | 1/1998 | Mestha | 399/49 |
| 5,717,978 | 2/1998 | Mestha | 399/46 |
| 5,734,407 | 3/1998 | Yamada et al. | 399/46 |
| 5,739,927 | * 4/1998 | Balasubramanian et al. | 358/518 |
| 5,748,221 | 5/1998 | Castelli et al. | 358/518 |
| 5,749,019 | 5/1998 | Mestha | 399/46 |
| 5,749,021 | 5/1998 | Mestha | 399/49 |
| 5,754,918 | 5/1998 | Mestha et al. | 399/48 |
| 5,812,903 | 9/1998 | Yamada et al. | 399/42 |
| 5,822,079 | 10/1998 | Okuno et al. | 358/406 |
| 5,881,209 | * 3/1999 | Stokes | 395/109 |
| 5,884,118 | 3/1999 | Mestha et al. | 399/15 |
| 6,002,842 | * 12/1999 | Oshio et al. | 395/109 |

FOREIGN PATENT DOCUMENTS 4-314768   11/1992   (JP) .

OTHER PUBLICATIONS

"Color Technology for Imaging Devices," Henry Kang, pp. 318–327.

"Miniature Lights for Miniature Spectrometers," Ocean Optics, Inc.

"Sequential Linear Interpolation of Multidimensional Functions," James Z. Chang et al., IEEE Transactions on Image Processing, vol. 6, No. 9, Sep. 1997.

* cited by examiner

*Primary Examiner*—Kimberly A Williams
(74) *Attorney, Agent, or Firm*—Oliff & Berridge, PLC

(57) ABSTRACT

A method of correcting for error in an output color of a colored output image in a marking device intended to match a desired image includes the steps of detecting a current output color in the output image with a color sensing device, determining a difference between the current output color and a corresponding target color under standard conditions, and automatically setting a marking device input-output relationship for a next output color based on the difference between the current output color and the corresponding target color under standard conditions to minimize the difference between the next output color and the corresponding target color.

29 Claims, 4 Drawing Sheets

DEVICE INDEPENDENT COLOR CONTROLLER AND METHOD

BACKGROUND OF THE INVENTION

1. Related Applications

The subject matter of the present application is related to the subject matter of the applications "Automatic Colorant Mixing Method and Apparatus" and "Dynamic Device Independent Image Correction Method and Apparatus" filed by the same assignee, which are incorporated herein by reference.

2. Field of Invention

The present invention relates to controlling the output of a marking device, and in particular, to a device independent color controller and method that uses information detected from a color output image to control individual color separations.

3. Description of Related Art

Customers continue to demand faster, higher quality and more sophisticated marking devices (e.g., printers, copiers, etc.). Additionally, customers demand the ability to reproduce their desired input images to achieve accurate output that does not vary over time (e.g., between pages or when output again at a later time) or among various marking devices (e.g., among various printers on a network, between home and office marking devices, etc.). These considerations are more difficult to achieve with color marking devices because of the greater number of variables involved and the sensitivity of these devices to environmental conditions.

In addition to controlling other variables of the marking device subsystem, controlling the device independent marking device tone reproduction curves (TRCs) for a color marking device would also be desirable. Tone reproduction curves are stored plots of an input parameter value versus an output parameter value. A TRC is a monitonically increasing marking device function in input-output contone space, input-output density space or input-output byte space, or combinations thereof. In other words, a TRC indicates the value of the output parameter for a specific device that must be used to reproduce the input parameter.

It would be desirable to use controlled tone reproduction curves at different steps in the reproduction process. The controlled tone reproduction curve for any one of the marking device color separations would account for the variability in reproducing that color in the marking device.

Moreover, it would be desirable to provide controlled of tone reproduction curves on a real time basis, either between jobs or within a single job, to account for ongoing marking device variability.

SUMMARY OF THE INVENTION

According to a method of the invention, error in an output color of a colored output image in a marking device intended to match a desired image is corrected. The method includes the steps of detecting a current output color in the output image with a color sensing device, determining a difference between the current output color and a corresponding target color under standard conditions and automatically setting a marking device input-output relationship for a next output color based on the difference between the current output color and the corresponding target color under standard conditions to minimize the difference between the next output color and the corresponding target color.

The step of determining preferably includes obtaining the corresponding target color by accessing target color values stored in memory. Obtaining the corresponding target color preferably includes accessing a look-up table. Obtaining the corresponding target color preferably includes accessing a look-up table of target color spectra values.

The marking device input-output relationship is preferably a tone reproduction curve corrected for variability of the marking device. The step of setting preferably includes outputting a corrected tone reproduction curve for at least one of the color separations that the marking device is capable of outputting. Also, the step of determining preferably includes obtaining at least one nominal tone reproduction curve.

The step of determining preferably includes summing the at least one nominal tone reproduction curve and the processed difference between the current output color and the corresponding output color under standard conditions.

The step of determining preferably includes transforming spectra of the current output color from device independent space to control parameter space. The step of determining preferably includes transforming spectra of the target color from device independent space to control parameter space. The step of determining preferably includes calculating an error signal equal to the difference between the current output color and control parameter space and the corresponding target color under standard conditions in control parameter space.

The step of setting preferably includes obtaining a weighted error by multiplying the error signal by a gain matrix. The step of setting preferably includes integrating the weighted error with respect to an iteration number.

The step of determining preferably includes obtaining at least one nominal tone reproduction curve, and the step of setting preferably includes summing the integrated weighted error with the at least one tone reproduction curve to yield a corrected tone reproduction curve as the marking device input-output relationship.

The method preferably includes the step of outputting the marking device input-output relationship to at least one controller operating in a time hierarchical mode. The steps of detecting, determining and setting preferably occur while the marking device is outputting.

An apparatus for correcting error in an output color of a colored output image intended to match a desired image is also disclosed.

BRIEF DESCRIPTION OF THE DRAWINGS

Preferred embodiments of the invention will be described with reference to the following drawings, wherein like reference numerals refer to like elements, and wherein.

DETAILED DESCRIPTION OF PREFERRED EMBODIMENTS

Figure 1:
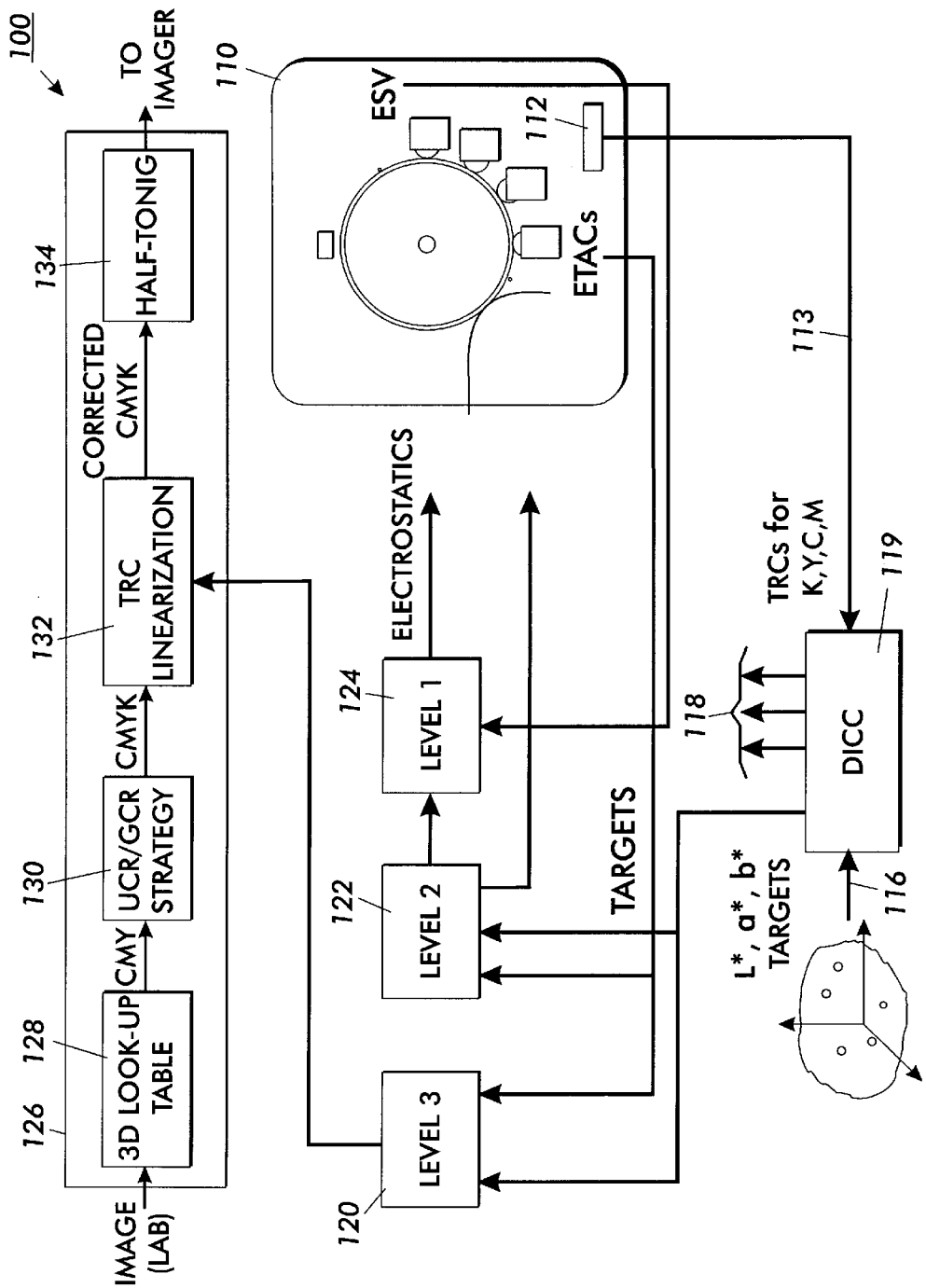
FIG. 1 is a system diagram showing the structure of and functions performed by a marking device system with a device independent color controller according to the invention.

In FIG. 1, a system diagram of a marking device system with a device independent color controller 100 according to the invention is shown. The marking device system includes a marking device output system 110 that develops and outputs an output image. A color sensing device 112 is positioned in operative relationship with the output image to detect the color of the output image. Preferably, the color sensing device detects reflectance spectra of the output image. The detected color of the output image is fed as an output 113 from the color sensing device 112 to a device independent color controller 114.

The device independent color controller 114 receives target values specified in spectral space via an input 116. When the target values are specified in L*, a*, b* space, a look-up table 300 is used first to transform target values in L*, a*, b* space received at an input 115 to target values in device independent spectral space at the input 116 before outputting these values to the device independent color controller 114. The device independent color controller 114 outputs TRCs for each color separation (typically, cyan, magenta, yellow and black) based on control processing of the target values received from the input 116 in view of the detected output values fed back via the input 113, as described below in greater detail.

The device independent color controller 114, which may be regarded as a "Level 4" controller, may be used in a time-hierarchical mode of operation in conjunction with a Level 3 controller 120, a Level 2 controller 122 and/or a Level 1 controller 124, as are disclosed in commonly assigned U.S. Pat. No. 5,471,313, which is incorporated herein by reference. The Level 1 controller 124 uses an electrostatic voltmeter (ESV) or the like to measure voltage levels on a photosensitive surface as a measure of the quality of the output image. The Level 2 controller 122 uses output from an enhanced toner coverage sensor (e.g., ETACs or the like) to measure developed toner levels on a toner sensitive surface as a measure of the quality of the output image. The Level 3 controller 120 uses the output from ETACs and the output from the device independent color controller 114, which are the TRCs in contone space. The output of the Level 2 controller 122 is fed to the Level 1 controller 124 and to a development system for the marking device.

The output of the Level 3 controller 120 is an input to a marking device algorithm block 126. In particular, the output of the Level 3 controller 120 is an input to a TRC linearization block 132 of the marking device calibration block 126.

The marking device calibration block 126 for a conventional marking device (e.g., a conventional four-color printer or copier) includes: a 3-D look-up table 128 for mapping an input image specified in device independent (i.e., parameter) space to CMY (cyan-magenta-yellow) space; a UCR/GCR (under color removal/gray component replacement) strategy block 138 to convert the CMY space parameters to CMYK space parameters; the TRC linearization block 132 that linearizes the TRCs to account for marking device variability and a half-toning strategy block 134 that converts the CMYK space parameters to a device specific description (e.g., bits to be received by a raster output scanner or similar device for outputting the image), with reference to a color rendition dictionary.

In a preferred embodiment, the color sensing device 112 is a spectrophotometer. In keeping with system requirements, spectrophotometers for marking device applications must be relatively small and inexpensive. The spectrophotometers produced by Micro Parts (Germany) and Ocean Optics are potentially suitable for marking device applications. Other color sensing devices, e.g., a colorimeter, may also be configured for use as the color sensing device 112.

Figure 2:
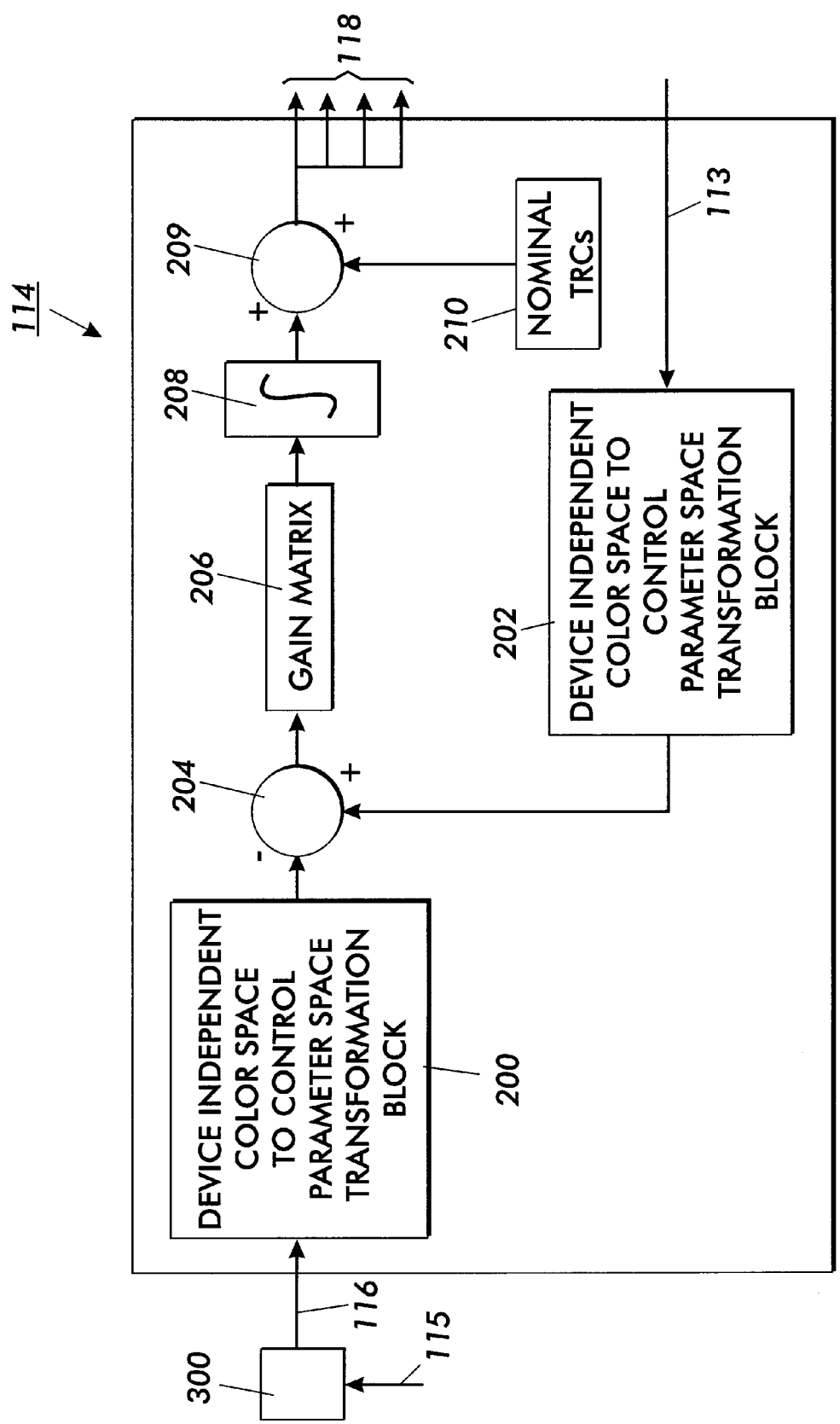
FIG. 2 is a detailed block diagram of the device independent controller according to the invention.

In FIG. 2, the detailed structure of and function performed by the device independent color controller 114 are shown. As stated above, the device independent color controller 114 receives the target values via the input 116. The target values are spectra values in device independent space at standard conditions taken from representative points in the color gamut of the marking device system 100. The target values are transformed from device independent color space to control parameter space in a transformation block 200.

The output 113 from the color sensing device 112, which is the measured reflectance or transmission spectra of the output image in device independent space (the "output spectra"), is the other input to the device independent color controller 114.

The output spectra is converted from device independent color space to control parameter space by a transformation block 202, similar to the transformation block 200.

The difference between the output of the transformation block 202 ($\beta$) and the output of the transformation block 200 ($\beta^{tar}$) at a first summing node 204 yields an error signal E equal to $\beta - \beta^{tar}$ expressed in control parameter space.

The error signal E is output from the first summing node 204 to a multiplier 206. The multiplier 206 multiplies the error E by a gain matrix K to yield a weighted error. The gain matrix is predetermined from input-output experimental data on the marking device and is stored in memory. The weighted error is output to an integrator 208. The integrator 208 integrates the weighted error with respect to a loop iteration number.

The output of the integrator 208, which are correction values to nominal TRCs is summed at a second summing node 209 with nominal TRCs retrieved from a memory 210. The nominal TRCs are those TRCs measured at standard conditions.

The output of the second summing node 209 is the corrected TRC for each color separation of the marking device system 110. In other words, in a typical four-color marking device, the output is a corrected cyan TRC, a corrected magenta TRC, a corrected yellow TRC and a corrected black TRC. Each output 118 is fed to the respective development subsystem (not shown) for each color, and to the Level 3 control 120. In one of the embodiments, when the device independent color controller loop is enabled, it updates the target TRCs for Level 2 and 3 controllers 122 and 120, thus enabling the device independent color controller 114 loop to lock to a common device independent parameter space.

As described above, the target values received by the device independent color controller 114 from the input 116 are expressed in device independent spectral space. Alternatively, the look-up table 300 can be used to first convert target values expressed in L*, a*, b* space to target values in device independent spectral space. The target values in L*, a*, b* space are obtained from standard pantone prints or from calibrated test patches using accurate spectrophotometry.

If calibrated test patches are used, the data obtained is stored in the look-up table 300. The look-up table 300 stores the data obtained from each calibrated test patch by test patch number, L*, a*, b* coordinates of the measured spectra and the wavelength of the spectra. Therefore, if the target values are expressed in L*, a*, b* space (e.g., as obtained from the color rendition dictionary), the look-up table 300 is accessed to return a spectral space value corresponding to the L*, a*, b* space value. The spectral space value of the target value is then output as the output 116 to the device independent color controller 116.

Figure 3:
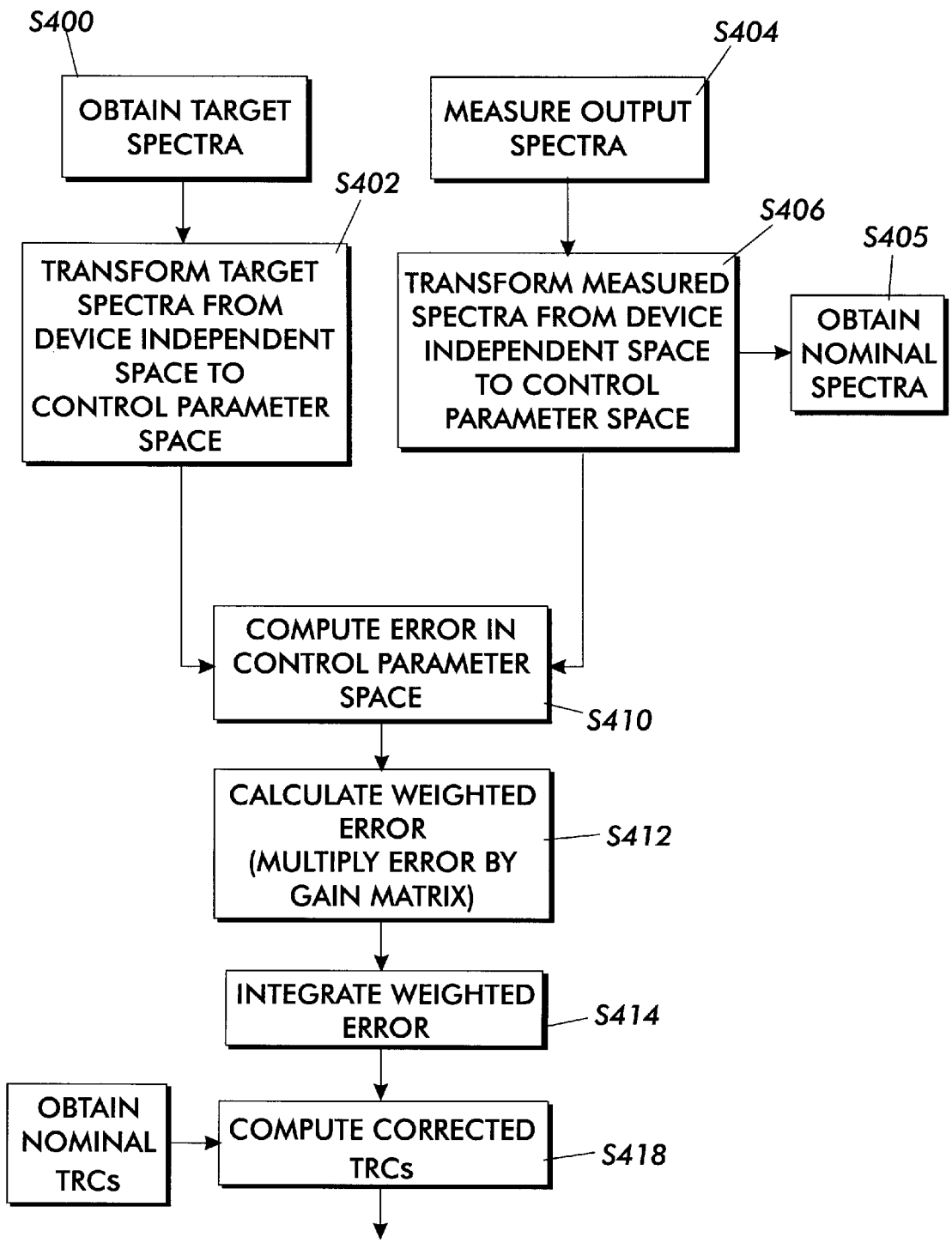
FIG. 3 is a flow chart showing the steps of a method according to the invention.

Steps performed by the device independent color controller 114 according to a method of the invention are shown in FIG. 3. In step S400, the target spectra is obtained.

In step S402, the target spectra is transformed from device independent space to control parameter space. If the target spectra obtained in S400 is in L*, a*, b* space, the target spectra is first converted to spectral space (e.g., by using the look-up table 300) before step S402 is performed.

In step S404, the output spectra is measured with the color sensing device 112. In step S405, nominal spectra values are obtained, e.g., from memory. In step S406, the measured spectra is transformed from device independent space to control parameter space. The detailed steps of the transformation performed in step S406 are described below in greater detail.

In step S410, the error signal E is calculated. In step S412, the weighted error is calculated by multiplying the error signal E by a gain matrix. In step S414, the weighted error is integrated with respect to the loop iteration number to determine a delta amount. In step S418, the nominal TRCs from a look-up table are summed with the delta amounts to determine the correction values to nominal TRCs. The corrected TRCs for each color separation are then output as the output 118, e.g., to lower level controllers and the individual color development subsystems.

Figure 4:
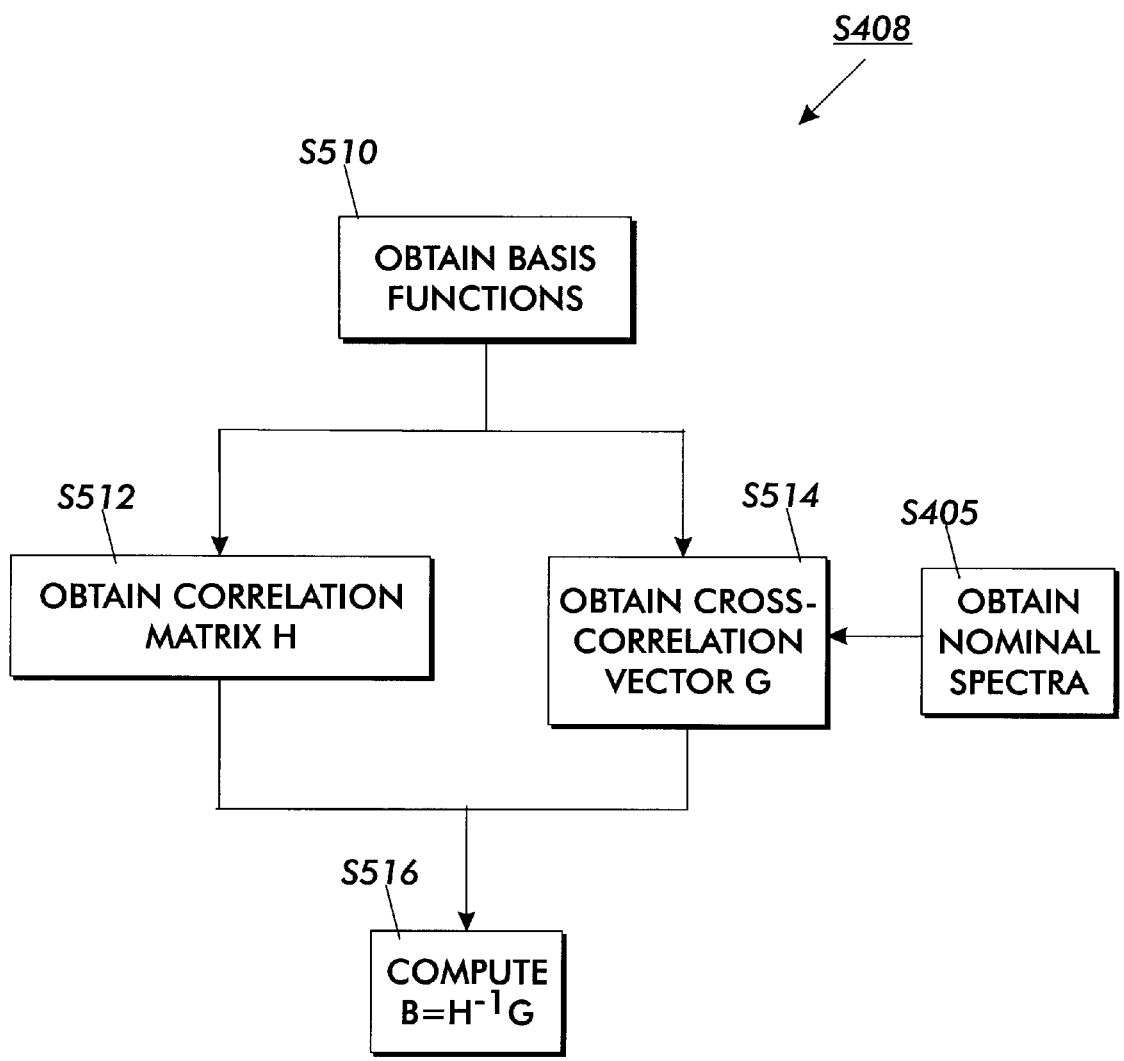
FIG. 4 is a flow chart of the steps performed in the sub-routine of the transformation step.

In FIG. 4, the detailed steps of transforming the measured spectra from device independent space to control parameter space (step S406) are shown.

In step S510, basis functions $\Psi_k(\alpha_i, \lambda)$ are obtained for $i=1, 2, \ldots, N$ and $k=1, 2, \ldots, N$, where N is the number of patches for which target spectra have been measured. The basis functions are preferably stored in memory, e.g., in a look-up table.

In step S512, a correlation matrix H is obtained. The correlation matrix may be calculated in this step, or it may preferably be precalculated and retrieved from memory. The calculation of the correlation matrix H is as follows:

$$H = [H_{mn}] = N \times N$$

$$H_{mn} = \sum_{i=1}^{N} \sum_{\lambda=\lambda_{min}}^{\lambda_{max}} \Psi_m^T(a_i, \lambda)\Psi_n(a_i, \lambda)$$

$$m = 1, 2, \ldots, N$$

$$n = 1, 2, \ldots, N$$

In step S514, a cross-correlation vector G is obtained. The cross-correlation vector G is calculated as follows:

$$G = [G_k] = N \times 1$$

$$G_k = \sum_{i=1}^{N} \sum_{\lambda=\lambda_{min}}^{\lambda_{max}} \Delta R^T(a_i, \lambda)\Psi_k(a_i, \lambda)$$

$$k = 1, 2, \ldots, N$$

where $\Delta R = R - R_0$

In step S516, coefficients $\beta$ are calculated as follows:

$$\beta = H^{-1}G$$

The reflectance spectra, R, measured for each area coverage is a nonlinear function of wavelength and toner mass.

In the case of a marking device that uses toner, toner mass is a function of area coverage. Around a nominal operating point, the reflectance spectra can be approximated by following a linear model. The linear model is obtained by applying Taylor series expansion around the nominal value.

$$\left(R(a, \lambda) = R_o(a, \lambda) + \frac{\partial R(a, \lambda)}{\partial R}\bigg|_{D_o} (D - D_o) + \text{Higher Order Terms}\right)$$

Neglecting all the higher order terms yields the following linear equation $$\left(R(a, \lambda) = R_o(a, \lambda) + \frac{\partial R(a, \lambda)}{\partial D}\bigg|_{D_o} (D - D_o)\right) \quad (1)$$

where, a=Area Coverages $R(a,\lambda)=[R_1(\lambda)\ R_2(\lambda) \ldots R_N(\lambda)]^T$, Spectra for patches at area coverages, a $R_o(a, \lambda)$=Nominal spectra corresponding to colors obtained under nominal TRCs at area coverages, a $D=[D_1 D_2 \ldots D_N]^T$, Toner mass at area coverages, a $D_o$=Nominal toner mass vector at area coverages, a N=Total number of patches (e.g., if there are three patches each for Y,M,C and K, then the total number of patches is 12).

The derivative terms (known as the Jacobian) are given by $$\frac{\partial R(a, \lambda)}{\partial D} = \begin{bmatrix} \frac{\partial R_1(\lambda)}{\partial D_1} & \frac{\partial R_1(\lambda)}{\partial D_2} & \cdots & \frac{\partial R_1(\lambda)}{\partial D_N} \\ \frac{\partial R_2(\lambda)}{\partial D_1} & \frac{\partial R_2(\lambda)}{\partial D_2} & \cdots & \frac{\partial R_2(\lambda)}{\partial D_N} \\ \vdots & \vdots & \vdots & \vdots \\ \frac{\partial R_N(\lambda)}{\partial D_1} & \frac{\partial R_N(\lambda)}{\partial D_2} & \cdots & \frac{\partial R_N(\lambda)}{\partial D_N} \end{bmatrix} \quad (2)$$

The elements of the matrix are referred to as differential colorimetric functions. These functions form the basis functions for the marking device. Of course, other functions, such as wavelet functions, orthogonal functions, quasi-orthogonal functions, functions derived from experimental input-output data, or combinations thereof, can also be used. If three test patches are created for each color separation, e.g., at low half tone, at mid half tone and at high half tone, then the total number of basis functions is three times the number of color separations.

To obtain the transformation to the control parameter domain, precalculated colorimetric functions are used. The basis functions are represented as:

$$\Psi_1(a, \lambda) = \begin{bmatrix} \frac{\partial R_1(\lambda)}{\partial D_1} \\ \frac{\partial R_2(\lambda)}{\partial D_1} \\ \vdots \\ \frac{\partial R_N(\lambda)}{\partial D_1} \end{bmatrix}, \quad (3)$$

-continued $$\Psi_2(a, \lambda) = \begin{bmatrix} \frac{\partial R_1(\lambda)}{\partial D_2} \\ \frac{\partial R_2(\lambda)}{\partial D_2} \\ \vdots \\ \frac{\partial R_N(\lambda)}{\partial D_2} \end{bmatrix}, \ldots \Psi_N(a, \lambda) = \begin{bmatrix} \frac{\partial R_1(\lambda)}{\partial D_N} \\ \frac{\partial R_2(\lambda)}{\partial D_N} \\ \vdots \\ \frac{\partial R_N(\lambda)}{\partial D_N} \end{bmatrix}$$

The measured spectra (e.g., for four color separations and three patches per separation, there will be twelve spectra) from the spectrophotometer are written in terms of the linear combination of the basis functions as follows.

$$\Delta R(a,\lambda) = R(a,\lambda) - R_o(a,\lambda) = \beta_1 \Psi_1(a,\lambda) + \beta_2 \Psi_2(a,\lambda) + \ldots + \beta_N \Psi_N(a,\lambda) \quad (4)$$

Equation (4) is computed for each value of the wavelength. Equation (4) is then multiplied by the transpose of the basis functions. Regrouping the basis functions in matrix form yields $$\begin{bmatrix} \psi_1^T(a, \lambda) \Delta R(a, \lambda) \\ \psi_2^T(a, \lambda) \Delta R(a, \lambda) \\ \vdots \\ \psi_3^T(a, \lambda) \Delta R(a, \lambda) \end{bmatrix} = \quad (5)$$

$$\begin{bmatrix} \psi_1^T(a, \lambda)\Psi_1(a, \lambda) & \psi_1^T(a, \lambda)\Psi_1(a, \lambda) & \ldots & \psi_1^T(a, \lambda)\Psi_N(a, \lambda) \\ \psi_2^T(a, \lambda)\Psi_1(a, \lambda) & \psi_2^T(a, \lambda)\Psi_2(a, \lambda) & \ldots & \psi_2^T(a, \lambda)\Psi_N(a, \lambda) \\ \vdots & \vdots & \vdots & \vdots \\ \psi_N^T(a, \lambda)\Psi_1(a, \lambda) & \psi_N^T(a, \lambda)\Psi_2(a, \lambda) & \ldots & \psi_N^T(a, \lambda)\Psi_N(a, \lambda) \end{bmatrix} \begin{bmatrix} \beta_1 \\ \beta_2 \\ \vdots \\ \beta_N \end{bmatrix}$$

By integrating equation (5) with respect to the area coverages and the wavelength, the solution for the control parameter $\beta$ vector can be found as follows:

$$\beta = H^{-1} G$$

Where, $$\beta = [\beta_1 \ \beta_2 \ \ldots \ (\beta_N)]^T, \quad (7)$$

$$H = [H_{ij}] = N \times N, \ H_{ij} = \sum_{i=1}^{N} \sum_{\lambda=\lambda_{min}}^{\lambda_{max}} \psi_i^T(a, \lambda)\psi_j(a, \lambda), \text{ and}$$

$$G = [G_1 \ G_2 \ \ldots \ (G_N)]^T, \ G_i = \sum_{i=1}^{N} \sum_{\lambda=\lambda_{min}}^{\lambda_{max}} \Delta R^T(a, \lambda)\psi_i(a, \lambda)$$

The control parameter $\beta$ vector represents an individual tone reproduction curve. Equation (7) yields the device independent space to control parameter space transformation.

The invention provides faster computation compared to the device independent image correction algorithm because the invention operates in one-dimensional space using the TRCs as actuators. Further, the invention does not require the rebuilding of the conventional 3-D look-up table. Also, the invention removes metamerism (i.e., an effect that the same color appears differently under different lighting/environmental conditions).

Although the invention has been described in connection with preferred embodiments, the invention is not limited to the disclosed embodiments. On the contrary, the application is intended to cover all alternatives, modifications and equivalents that may be included within the spirit and scope of the invention, as defined by the independent claims.

What is claimed is:

1. A method of controlling an output color in a marking device to match a desired color of an input image, comprising:
   detecting the output color with a color sensing device;
   obtaining a target color in device independent space,
   comparing the detected output color with the target color; and
   automatically correcting, based on a difference between the output color and the target color, at least one tone reproduction curve of the marking device such that the output color of the marking device more accurately resembles the desired color.

2. A method of correcting for error in an output color of a colored output image in a marking device intended to match a desired image, comprising:
   detecting a current output color in the output image with a color sensing device;
   obtaining a corresponding target color in device independent space under standard conditions,
   determining a difference between the current output color and the corresponding target color; and
   automatically setting at least one marking device tone reproduction curve for a next output color based on the difference between the current output color and the corresponding target color to minimize the difference between the next output color and the corresponding target color.

3. The method of claim 2, wherein the determining step includes obtaining the corresponding target color by accessing target color values stored in memory.

4. The method of claim 3, wherein obtaining includes accessing a look-up table.

5. The method of claim 3, wherein obtaining includes accessing a look-up table of target color spectra values.

6. The method of claim 2, wherein the at least one marking device tone reproduction curve is a tone reproduction curve corrected for variability of the marking device.

7. The method of claim 2, wherein the step of setting at least one marking device tone reproduction curve includes outputting a corrected tone reproduction curve for at least one color separation that the marking device is capable of outputting.

8. The method of claim 7, wherein the step of determining includes obtaining at least one nominal tone reproduction curve.

9. The method of claim 8, wherein the step of determining includes summing the at least one nominal tone reproduction curve and the processed difference between the current output color and the corresponding output color under standard conditions.

10. The method of claim 7, wherein the step of determining includes transforming spectra of the current output color from device independent space to control parameter space.

11. The method of claim 7, wherein the step of determining includes transforming spectra of the target color from device independent space to control parameter space.

12. The method of claim 7, wherein the current output color and the corresponding target color under standard conditions are expressed in control parameter space, and the step of determining the difference includes calculating an error signal equal to the difference between the current output color in control parameter space and the corresponding target color under standard conditions in control parameter space.

13. The method of claim 12, wherein the step of setting includes obtaining a weighted error by multiplying the error signal by a gain matrix.

14. The method of claim 13, wherein the step of setting includes integrating the weighted error with respect to an iteration number.

15. The method of claim 14, wherein the step of determining includes obtaining at least one nominal tone reproduction curve, and wherein the step of setting includes summing the integrated weighted error with the at least one tone reproduction curve to yield a corrected tone reproduction curve as the marking device input-output relationship.

16. The method of claim 2, further comprising the step of outputting the at least one marking device tone reproduction curve to controllers operating in a time hierarchical mode.

17. The method of claim 2, wherein the steps of detecting, determining and setting occur while the marking device is outputting.

18. The method of claim 2, wherein determining includes obtaining target color values under current conditions from test patches in an output image.

19. An apparatus for correcting error in an output color of a colored output image intended to match a desired image, comprising:
a color sensing device capable of sensing a current output color in the output image; and
a controller linked to the color sensing device that determines a difference between the current output color and a corresponding target color in device independent space under standard conditions, and automatically sets at least one marking device tone reproduction curve of a next output color based on the difference between the current output color and the corresponding target color to minimize the difference between the next output color and the corresponding target color.

20. The apparatus of claim 19, wherein the controller is linked to a memory containing target colors under standard conditions, and the controller accesses the memory to obtain the corresponding target color under standard conditions.

21. The apparatus of claim 20, wherein the memory is a look-up table containing target colors under standard conditions expressed in device independent space.

22. The apparatus of claim 20, wherein the memory is a look-up table containing target colors under standard conditions expressed in device independent space trichometric quantities.

23. The apparatus of claim 20, wherein the memory is a look-up table containing target colors under standard conditions expressed in device independent space spectral quantities.

24. The apparatus of claim 19, wherein the controller includes a transformation block to transform spectra of the current output color from device independent space to control parameter space.

25. The apparatus of claim 19, wherein the controller includes a transformation block to transform spectra of the target color under standard conditions from device independent space to control parameter space.

26. The apparatus of claim 19, wherein the controller includes a summing node that computes an error equal to the difference between the current output color expressed in control parameter space and the target color under standard conditions expressed in control parameter space.

27. The apparatus of claim 26, wherein the controller includes a multiplier that calculates a weighted error by multiplying the error by a gain matrix.

28. The apparatus of claim 27, wherein the controller includes an integrator that integrates the weighted error with respect to an iteration number.

29. The apparatus of claim 28, wherein the summing node is a first summing node and the controller includes a second summing node that sums the integrated weighted error with nominal tone reproduction curves retrieved from memory.

* * * * *